US008923267B2

(12) United States Patent
Soliman

(10) Patent No.: US 8,923,267 B2
(45) Date of Patent: Dec. 30, 2014

(54) SYSTEM AND METHOD FOR HIGH SPEED PEER-TO-PEER CONNECTIVITY BETWEEN WIRELESS DEVICES

(75) Inventor: Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1522 days.

(21) Appl. No.: 11/683,865

(22) Filed: Mar. 8, 2007

(65) Prior Publication Data

US 2008/0002658 A1 Jan. 3, 2008

Related U.S. Application Data

(60) Provisional application No. 60/818,193, filed on Jun. 30, 2006.

(51) Int. Cl.
*H04J 1/00* (2006.01)
*H04W 76/02* (2009.01)
*H04W 72/04* (2009.01)

(52) U.S. Cl.
CPC ............ *H04W 76/023* (2013.01); *H04W 72/04* (2013.01)
USPC ............................. 370/343; 455/518; 455/519

(58) Field of Classification Search
CPC .. H04W 88/06; H04W 88/02; H04L 27/2647; H04L 1/0631
USPC .................. 370/343; 455/518, 519, 450, 464, 455/452.1, 452.2, 453, 454, 575.7
See application file for complete search history.

(56) References Cited

U.S. PATENT DOCUMENTS

| 7,239,882 | B1 * | 7/2007 | Cook ............................ 455/519 |
| 7,298,328 | B2 * | 11/2007 | Wang et al. ................... 342/451 |
| 2002/0009158 | A1 * | 1/2002 | Souissi et al. ................. 375/295 |
| 2002/0085520 | A1 * | 7/2002 | Sydon et al. .................. 370/335 |
| 2002/0118385 | A1 * | 8/2002 | Nagashima .................. 358/1.15 |
| 2002/0147771 | A1 * | 10/2002 | Traversat et al. ............. 709/203 |
| 2003/0144003 | A1 | 7/2003 | Ranta et al. |
| 2004/0063444 | A1 * | 4/2004 | Tissot et al. ................... 455/466 |
| 2004/0121766 | A1 | 6/2004 | Benson et al. |
| 2004/0203717 | A1 * | 10/2004 | Wingrowicz et al. ......... 455/423 |

(Continued)

FOREIGN PATENT DOCUMENTS

| CN | 1732651 A | 2/2006 |
| WO | WO2004032536 | 4/2004 |

(Continued)

OTHER PUBLICATIONS

Office Action for European Application Serial No. 07799243.6 dated May 28, 2010, 7 pages.

(Continued)

*Primary Examiner* — Wesley Kim
*Assistant Examiner* — Edd Rianne Plata
(74) *Attorney, Agent, or Firm* — Kevin T. Cheatham

(57) ABSTRACT

A device and method is provided to facilitate direct high speed data transfer between at least two wireless devices in order to support high speed local connectivity while mitigating the need for multimedia servers. A short range high speed link is established between wireless devices using an uplink band of a licensed spectrum in the case of Frequency Division Duplex (FDD) systems and the same band in the case of Time Division duplex (TDD) systems, hence enhancing the spectrum efficiency.

56 Claims, 9 Drawing Sheets

(56) References Cited

U.S. PATENT DOCUMENTS

| | | | |
|---|---|---|---|
| 2005/0277424 A1* | 12/2005 | McKenna et al. | 455/450 |
| 2006/0178148 A1* | 8/2006 | Du et al. | 455/445 |
| 2007/0207780 A1* | 9/2007 | McLean | 455/414.1 |
| 2007/0275696 A1* | 11/2007 | Cheng et al. | 455/412.1 |

FOREIGN PATENT DOCUMENTS

| | | | |
|---|---|---|---|
| WO | WO2005050919 | A2 | 6/2005 |
| WO | WO2005060182 | * | 6/2005 |
| WO | WO2005060182 | A1 | 6/2005 |
| WO | WO2005084045 | A1 | 9/2005 |

OTHER PUBLICATIONS

Office Action for Korean Patent Application No. 2009-7001289 (English Translation), Oct. 4, 2010, 4 pages.

International Search Report, PCT/US2007/072648, International Searching Authority, European Patent Office, Jan. 30, 2008.

Written Opinion, PCT/US2007/072648, International Searching Authority, European Patent Office, Jan. 30, 2008.

* cited by examiner

SYSTEM AND METHOD FOR HIGH SPEED PEER-TO-PEER CONNECTIVITY BETWEEN WIRELESS DEVICES

PRIORITY

The subject application claims priority to Provisional Patent Application Ser. No. 60/818,193, filed Jun. 30, 2006, entitled "System and method for High Speed Local Connectivity Between Local Devices."

BACKGROUND

1. Field

Various configurations pertain to wireless communications and particularly to a system and method for direct high speed data transfer between two wireless devices.

2. Background

Wireless connectivity has enabled a new mobile lifestyle filled with conveniences for mobile users. User mobility and ever increasing information dissemination is spurring demand for greater mobile storage capacity. Mobile phones, for instance, are becoming personal storage devices for telephone numbers, graphic images, audio and/or video files, among other types of information. Consumers will soon demand ways to backup the stored information and/or exchange it with other devices. For example, interconnectivity would permit sharing of information among personal computers, personal digital recorders, MP3 players, digital camcorders, digital cameras, high-definition TVs (e.g., HDTVs), set-top boxes (STBs), gaming systems, personal digital assistants (PDAs), and cellular phones, among other devices. However, few convenient options currently exist for backing up information from mobile devices or for sharing such information with other devices.

Consequently, a method is needed to meet the needs for local connectivity without adding complexity to wireless devices.

SUMMARY

A method operational on an originator wireless device is provided for establishing a peer-to-peer channel in a wireless network. A peer-to-peer channel is requested for communicating directly with a target wireless device. The peer-to-peer channel is obtained from a wireless network manager. Data through the peer-to-peer channel is then transferred directly to the target wireless device. The peer-to-peer channel may be configured to enable both Time Division Duplex (TDD) and Frequency Division Duplex (FDD) wireless devices to communicate with each other. The peer-to-peer channel may be a communication channel in a Time Division Duplex (TDD) network and an uplink channel in a Frequency Division Duplex (FDD) network, wherein both the communication channel and uplink channel may use nominally the same frequency and allocated timeslots to facilitate interoperability between the TDD-enabled and FDD-enabled wireless devices. The peer-to-peer channel may be an uplink channel in a Frequency Division Duplex (FDD) wireless device that is used for both receiving and transmitting. The originator wireless device may be a cellular phone while the target wireless device may include one of either a computer, a cellular phone, a personal digital assistant, an audio device, a video device, a camera, a display device, a printer, or a digital storage device. The request for the direct peer-to-peer channel may identify the target wireless device.

In one example, a list of potential target wireless devices is obtained and the target wireless device is selected from the list.

In another example, scanning for available channels is performed to identify one or more available channels. At least one of the one or more identified channels are requested for the direct peer-to-peer channel.

The originator wireless device may use the target wireless device for backing up data. The originator wireless device may receive confirmation from the target wireless device that the transferred data was received. The network manager is then notified that the peer-to-peer channel can be deallocated. In one configuration, one or more channels may be aggregated in the peer-to-peer channel to increase its bandwidth. The peer-to-peer channel may be a local communication link for short-range communications between the originator wireless device and the target wireless device.

A wireless communications apparatus is also provided comprising (a) a storage device, (b) a wireless transceiver, and/or (c) a processor coupled to the storage device and the wireless transceiver. In one example, the processor may be configured to (1) request a peer-to-peer channel for communicating directly with a target wireless device, (2) obtain the peer-to-peer channel from a wireless network manager, and/or (3) transfer data through the peer-to-peer channel directly to the target wireless device. The processor may also be configured to identify one or more potential target wireless devices from which the target wireless device is selected. The peer-to-peer channel may be configured to enable both Time Division Duplex (TDD) and Frequency Division Duplex (FDD) wireless devices to communicate with each other. For example, the peer-to-peer channel may be a communication channel in a Time Division Duplex (TDD) network and an uplink channel in a Frequency Division Duplex (FDD) network, where both the communication channel and uplink channel use nominally the same frequency and allocated timeslots to facilitate interoperability between the TDD-enabled and FDD-enabled wireless devices.

The wireless transceiver may also include a diversity receiver chain configurable to receive on an uplink channel frequency when operating in peer-to-peer mode and on a downlink channel frequency otherwise. The wireless transceiver may be configured to communicate on a Frequency Division Duplex (FDD) network. Thus, the transceiver may include (a) a transmitter circuit tuned to transmit on an uplink frequency, (b) a first diversity receiver circuit tuned to receive on a downlink frequency, and/or (c) a second diversity receiver circuit adjustable to receive on either the uplink frequency or the downlink frequency depending on its mode of operation.

Consequently, a wireless communication device is provided, comprising: (a) means for requesting a peer-to-peer channel for communicating directly with a target wireless device; (b) means for obtaining the peer-to-peer channel from a wireless network manager; (c) means for transferring data through the peer-to-peer channel directly to the target wireless device; (d) means for transmitting on an uplink channel frequency; (e) means for receiving on the uplink channel frequency when operating in peer-to-peer mode and on a downlink channel frequency otherwise; (f) means for receiving confirmation from the target wireless device that the transferred data was received; and/or (g) means for notifying the network manager that the peer-to-peer channel can be deallocated.

A processing device is also provided comprising: a processing circuit configured to (a) request a peer-to-peer channel for communicating directly with a target wireless device;

(b) obtain the peer-to-peer channel from a wireless network manager; and/or (c) transfer data through the peer-to-peer channel directly to the target wireless device. The peer-to-peer channel may be a local communication link for short-range communications with the target wireless device, wherein the peer-to-peer link is defined by a frequency and timeslot.

A machine-readable medium having one or more instructions operational on an originator wireless device for establishing a peer-to-peer channel in a wireless network, which when executed by a processor causes the processor to: (a) request a peer-to-peer channel for communicating directly with a target wireless device; (b) obtain the peer-to-peer channel from a wireless network manager; and/or transfer data through the peer-to-peer channel directly to the target wireless device. To accomplish this task a list of potential target wireless devices may be obtained and the target wireless device is selected from that list. Another feature provides for scanning for available channels to identify one or more available channels. At least one of the one or more identified channels is then requested for the direct peer-to-peer channel.

A method operational on a target wireless device is also provided for communicating over a peer-to-peer channel in a wireless network. An invitation is received from a network manager to setup a peer-to-peer channel with an originator wireless device. A reply is sent to the network manager accepting the invitation. Data may then be received through the peer-to-peer channel directly from the originator device. The received data locally may be stored locally and a confirmation may be sent to the originator wireless device that the data was received. A receiver may be configured to receive on an uplink channel frequency when the target wireless device is a Frequency Division Duplex device. The peer-to-peer channel may be configured to enable both Time Division Duplex (TDD) and Frequency Division Duplex (FDD) wireless devices to communicate with each other using allocated timeslots on a particular frequency.

A processing device is also provided comprising a processing circuit configured to (a) receive an invitation from a network manager to setup a peer-to-peer channel with an originator wireless device; (b) send a reply to the network manager accepting the invitation; (c) listen on the peer-to-peer channel; and/or (d) receive data through the peer-to-peer channel directly from the originator wireless device. The peer-to-peer channel may be a local communication link for short-range communications with the target wireless device and the peer-to-peer link may be defined by a frequency and timeslot.

Consequently, a wireless communication device is provided comprising (a) means for receiving an invitation from a network manager to setup a peer-to-peer channel with an originator wireless device; (b) means for sending a reply to the network manager accepting the invitation; (c) means for receiving data through the peer-to-peer channel directly from the originator device; (d) means for storing the received data locally; (e) means for sending confirmation to the originator wireless device that the data was received; and/or (f) means for adjusting the frequency on which the wireless communication device receives from an downlink channel frequency to an uplink channel frequency when the wireless communications device is a Frequency Division Duplex device.

A machine-readable medium is also provide having one or more instructions operational on an target wireless device for communicating over a peer-to-peer channel in a wireless network, which when executed by a processor causes the processor to: (a) receive an invitation from a network manager to setup a peer-to-peer channel with an originator wireless device; (b) send a reply to the network manager accepting the invitation; (c) listen on the peer-to-peer channel; (d) receive data through the peer-to-peer channel directly from the originator wireless device; (e) store the received data locally; (f) send confirmation to the originator wireless device that the data was received; and/or (g) adjust a receiver of the wireless transceiver to receive on an uplink channel frequency when the wireless communications apparatus is a Frequency Division Duplex device.

A radio transceiver adjustable to receive on uplink frequency is also provided, comprising: (a) a transmitter circuit tuned to transmit on an uplink frequency; (b) a first diversity receiver circuit tuned to receive on a downlink frequency; and/or (c) a second diversity receiver circuit adjustable to receive on either the uplink frequency or the downlink frequency depending on its mode of operation. Additionally, a first antenna may be coupled to the transmitter circuit to transmit signals from the transmitter circuit, the first antenna may also be coupled to the first diversity receiver circuit to receive signals for the first diversity receiver circuit. A second antenna may be coupled to the second diversity receiver circuit to receive signals for the second diversity receiver circuit.

A method operational on a wireless network manager apparatus is also provided for establishing a peer-to-peer channel between wireless devices. A request for a peer-to-peer link between an originator wireless device and a target wireless device is received. A channel is allocated for the peer-to-peer link and the originator and target wireless devices are notified of the allocated channel. The target wireless device may be notified of the peer-to-peer link request by the originator wireless device. A determination is then made as to whether the target wireless device is willing to accept the peer-to-peer link with the originator wireless device. The originator wireless device may be notified as to whether the target wireless device has accepted the peer-to-peer link. The peer-to-peer link may be defined by a frequency and timeslot. For example, the frequency may be a communication channel in a Time Division Duplex (TDD) network and an uplink channel in a Frequency Division Duplex (FDD) network to facilitate interoperability between the TDD-enabled and FDD-enabled wireless devices. A list of available and reachable wireless devices in the vicinity of originator device may be obtained and the list of wireless devices may be sent to the originator wireless device from where the target wireless device can be selected. The wireless devices in the list may be identified by employing radio frequency (RF) signatures from the wireless devices to group them according to geographical location.

Another implementation provides a network manager device comprising (a) a wireless communication circuit through which to communicate with wireless devices on a network; and (b) a processing circuit coupled to the wireless communication circuit. The processing circuit may be configured to (1) receive a request for a peer-to-peer link between an originator wireless device and a target wireless device; (2) allocate a channel for the peer-to-peer link; (3) notify the originator and target wireless devices of the allocated channel; (4) notify the target wireless device of the peer-to-peer link request by the originator wireless device; (5) determine whether the target wireless device is willing to accept the peer-to-peer link with the originator wireless device; (6) notify the originator wireless device that the target wireless device has accepted the peer-to-peer link; (7) receive a message indicating that the peer-to-peer link can be deallocated; and/or (8) deallocate the channel for the peer-to-peer link.

DETAILED DESCRIPTION

Figure 1:
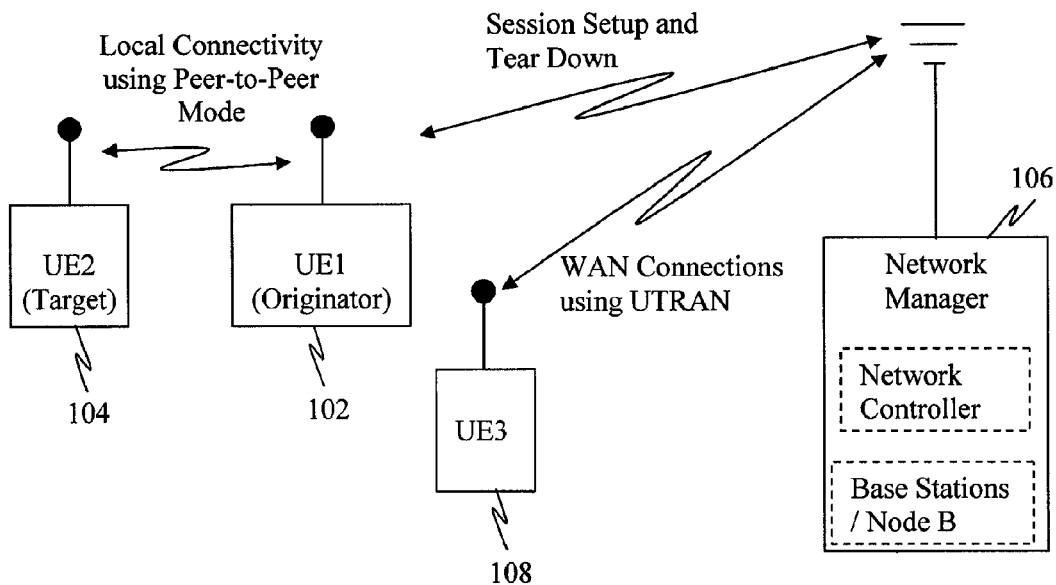
FIG. 1 is a block diagram illustrating an example of a configuration in which direct local connectivity between two wireless devices may be implemented within a managed wireless communication network.

In the following description, specific details are given to provide a thorough understanding of the examples and configurations. However, it will be understood by one of ordinary skill in the art that the examples and configurations may be practiced without these specific details. For example, circuits may not be shown in block diagrams in order not to obscure the examples and configurations in unnecessary detail.

Also, it is noted that the examples and configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, examples and configurations may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

One feature provides a system and method that facilitates data transfer between two wireless devices in order to support local connectivity without the need for a multimedia server. Communications are setup between the two wireless devices by reusing a communication band, typically used for long range communications through a base station, to establish a local (short range) high speed link between the two wireless devices. This dual use of the communication band also enhances spectrum efficiency by avoiding the need for additional hardware to implement the short range link. This mode of peer-to-peer (P2P) short range communication is established by sending a request to a base station to setup a channel between the two wireless devices. Once the channel is setup or reserved, the two wireless devices may communicate directly.

Another feature provides for using a single frequency to permit both time division duplex (TDD) and frequency division duplex (FDD) wireless devices to communicate with each other over the peer-to-peer link. That is, the peer-to-peer channel is defined by the uplink channel of an FDD network at nominally the same frequency as the transmission channel of a TDD network. Timeslots may be used within the peer-to-peer channel to transmit information between TDD and/or FDD wireless devices.

As used herein the terms "wireless device" and "mobile device" refer to devices having a wireless communication interface.

FIG. 1 is a block diagram illustrating an example of a configuration in which direct local connectivity between two wireless devices may be implemented within a managed wireless communication network. User devices UE1 102 and UE2 104 may operate in either a managed mode (via a network manager 106) or a peer-to-peer mode. In managed mode, communications to/from UE1 102 or UE2 104 go through a network manager 106 that may allocate communication channels (e.g., frequencies and/or timeslots), validate user devices, and/or handle communications to/from user devices. The term "network manager" refers to network infrastructure devices (e.g., base station, Node B, network controllers, etc.) that setup communications between mobile devices, allocate channels, etc.

In peer-to-peer mode, two wireless devices (i.e., peers) share resources and information with each other, having equal capabilities and responsibilities and with neither being specifically a client or server. An originator device UE1 102 requests that the network manager 106 setup a channel (e.g., frequency and/or timeslot) with a target device UE2 104. The network manager 106 allocates a channel (e.g., frequency and/or timeslot and notifies the target device UE2 104 and/or originator user device UE1 102 that the allocated channel/timeslot has been reserved for local communications between them. The allocated channel may be within a licensed communication spectrum typically used for managed communications (e.g., wide area network communications through the network manager 106). Originator device UE1 102 may then transfer information (e.g., voice communication, data, files, etc.) to the target device UE2 104, or vice versa. Once communications are completed between UE1 102 and UE2 104, a message is sent to network manager 106, by either UE1 102 and/or UE2 104, to relinquish the allocated channel (e.g., allocated frequency and/or timeslot).

Note that the high speed local connection between UE1 102 and UE2 104 may operate at the same time that other parts of the spectrum are used by the network manager 106 to provide managed communications (e.g., voice and/or data applications) to other devices UE3 108 on a wide area network. That is, the frequency band normally used by the network is reused to setup the peer-to-peer link/channel.

Once the peer-to-peer link is established, allocated, and/or reserved, devices UE1 and UE2 may share resources, such as data or file transfer or exchange. For example, the originator device UE1 102 may seek to backup information on the target device UE2 104. The target device UE2 104 either accepts or rejects the request to backup information. If the backup request is accepted, originator device UE1 102 sends the information to be backed up to the target device UE2 104 where it is saved. In another example, a prearranged agreement may exists between originator device 102 and target device UE2 104 allowing originator device UE1 102 to backup information to target device UE2 104. In yet other examples, other types of data may be transferred between wireless devices UE1 102 and UE2 104 via the peer-to-peer link.

In one example, the peer-to-peer link is used for local or short-range communications between wireless devices UE1 and UE2. That is, the peer-to-peer link allows wireless devices that are from a few inches to several hundred feet apart to communicate. By contrast, communication links to cellular network devices (e.g., base stations, node Bs, etc.) operate over several miles. Because the peer-to-peer link is local, a wireless device may be able to reduce its transmission power level when communicating with another device over the peer-to-peer link. Additionally, since a peer-to-peer channel is local, the network manager 106 may reuse the same frequency/timeslot channel for multiple peer-to-peer links at the same time on geographically separate regions. That is, so long as the wireless devices communicating over a first peer-to-peer channel are geographically distanced from the wireless devices communicating over a second peer-to-peer channel, both the first and second peer-to-peer channels can operate on nominally the same frequency and/or timeslot.

The local connectivity session or high-speed link between wireless devices UE1 102 and UE2 104 may be implemented in various protocols, including, for example, high-speed downlink packet access (HSDPA) protocol or 1x evolution-data optimized (EVDO) protocol. Given the benign channel conditions, the transfer rate may approach the maximum theoretical value with low transmit power from the two wireless devices UE1 102 and UE2 104. This may help minimize the impact of interference and/or resource utilization on the network manager 106 (e.g., Node B or base station). The interference seen at network manager 106 (e.g., Node B or base station) and caused by the peer-to-peer link is minimal since the two devices are very close to each other relative to their respective distance to the network manager 106.

This method may be implemented using existing radio hardware in the wireless devices UE1 102 and UE2 104 and hence, there is no need to add additional radios to the wireless devices UE1 102 and/or UE2 104.

The peer-to-peer mode of operation illustrated in FIG. 1 may be implemented in various communication architectures and/or schemes. For example, Frequency Division Duplex (FDD) and Time Division Duplex (TDD) are the two most prevalent duplexing schemes used in wireless networks.

In order to permit both TDD and FDD wireless devices to communicate with each other, a peer-to-peer channel is defined as the uplink channel of an FDD-enabled device and/or the transmission channel of a TDD-enabled device, where nominally the same frequency and timeslot are used for both the FDD uplink channel and the TDD transmission channel.

Figure 2:
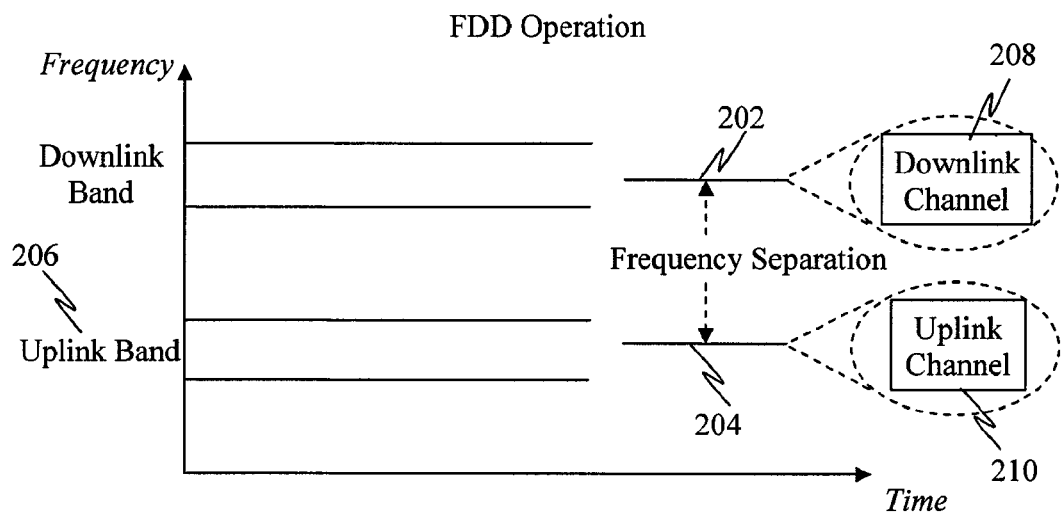
FIG. 2 illustrates examples of uplink and downlink channels of a frequency division duplex (FDD) network.

FIG. 2 illustrates examples of uplink and downlink channels of a frequency division duplex (FDD) network. FDD has historically been used in voice applications and supports two-way radio communications by using two distinct radio channels. In wireless systems that use FDD, one frequency 202 is typically used as a downlink channel to transmit information from a communication manager (e.g., local base station) to a mobile device. A second frequency 204 is typically used as an uplink channel to transmit information from the mobile device to the communication manager (e.g., Node B or base station). Because of the pairing of frequencies, simultaneous transmission in both directions is possible. Typically, downlink channel 208 and an uplink channel 210 are allocated within a downlink band and an uplink band, respectively. To mitigate self-interference between the uplink and downlink channel transmissions, a minimum amount of frequency separation is maintained between the two allocated channels 202 and 204.

Figure 3:
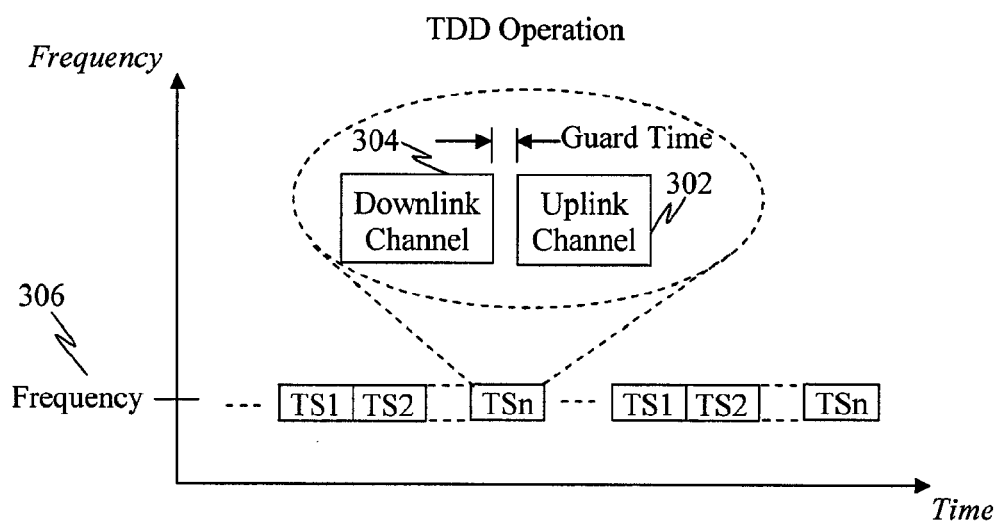
FIG. 3 illustrates examples of uplink and downlink channels within a time division duplex (TDD) network.

FIG. 3 illustrates examples of uplink and downlink channels within a time division duplex (TDD) network. In wireless systems that use TDD, a single frequency 306 is divided into timeslots TS1, TS2, TSn, where each timeslot defines a channel to transmit signals in both the downlink and uplink directions. For instance, each timeslot TS may be allocated to a different wireless device for communications to/from that wireless device. Each timeslot may be further divided into an uplink channel 302 and a downlink channel 304. Additionally, the size (e.g., time allocation) of the uplink channel 302 and downlink channel 304 may be adjusted (i.e., increased or decreased) as desired.

According to one implementation, the peer-to-peer link/channel may be setup to permit both FDD and TDD wireless devices to communicate with each other. For example, the network manager may allocate a peer-to-peer channel such that the TDD frequency 306 (FIG. 3) is nominally the same as the FDD uplink frequency 204 (FIG. 2). Thus, a TDD-enabled wireless device communicates on the allocated communication channel (i.e., timeslot TSn on frequency 306) while an FDD-enabled wireless device uses its uplink channel 210 (i.e., at frequency 204) to communicate with each other.

This peer-to-peer link also allows two or more TDD-enabled wireless devices to communicate with each other over channel frequency 306. Similarly, two or more FDD-enabled wireless devices may communicate with each other over uplink channel frequency 206. That is, the uplink channel 202 is used by FDD devices to transmit and receive information over the direct peer-to-peer link.

Figure 4:
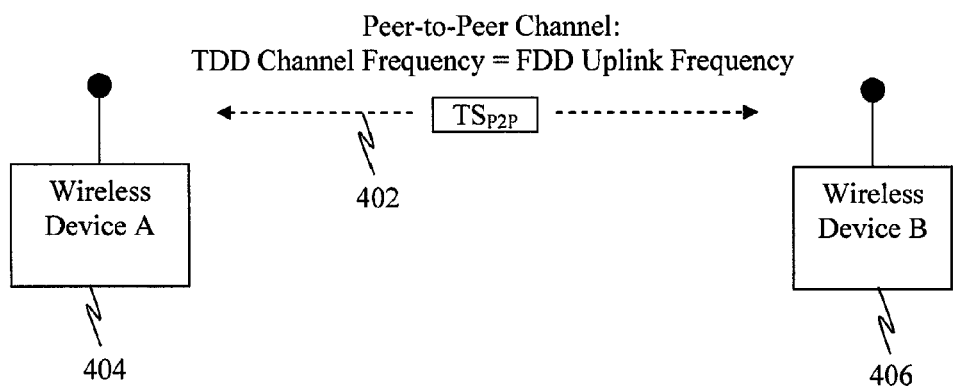
FIG. 4 illustrates one example of a peer-to-peer link between two wireless devices.

FIG. 4 illustrates one example of a peer-to-peer link 402 between two wireless devices 404 and 406. The peer-to-peer link 402 is setup so that a local TDD channel frequency is nominally the same as an FDD uplink channel frequency. One or more timeslots $TS_{P2P}$ are then used to communicate between wireless devices 404 and 406. In this example, device A 404 may initiate a data transfer to device B 406. If device B 406 is an FDD-enabled device, it may be reconfigured to listen or receive on the FDD uplink frequency (instead of the downlink frequency) using timeslots. Once device B 406 has received the data, it may reply with a confirmation message over the peer-to-peer link 402.

In an alternative implementation, a peer-to-peer link may instead be setup so that a local TDD channel frequency is nominally the same as an FDD downlink channel frequency. In this implementation, a FDD-enabled device is reconfigured to transmit on the FDD downlink frequency (instead of the uplink frequency) using timeslots.

Various methods may be used to setup a peer-to-peer link within a managed communication network.

Figure 5:
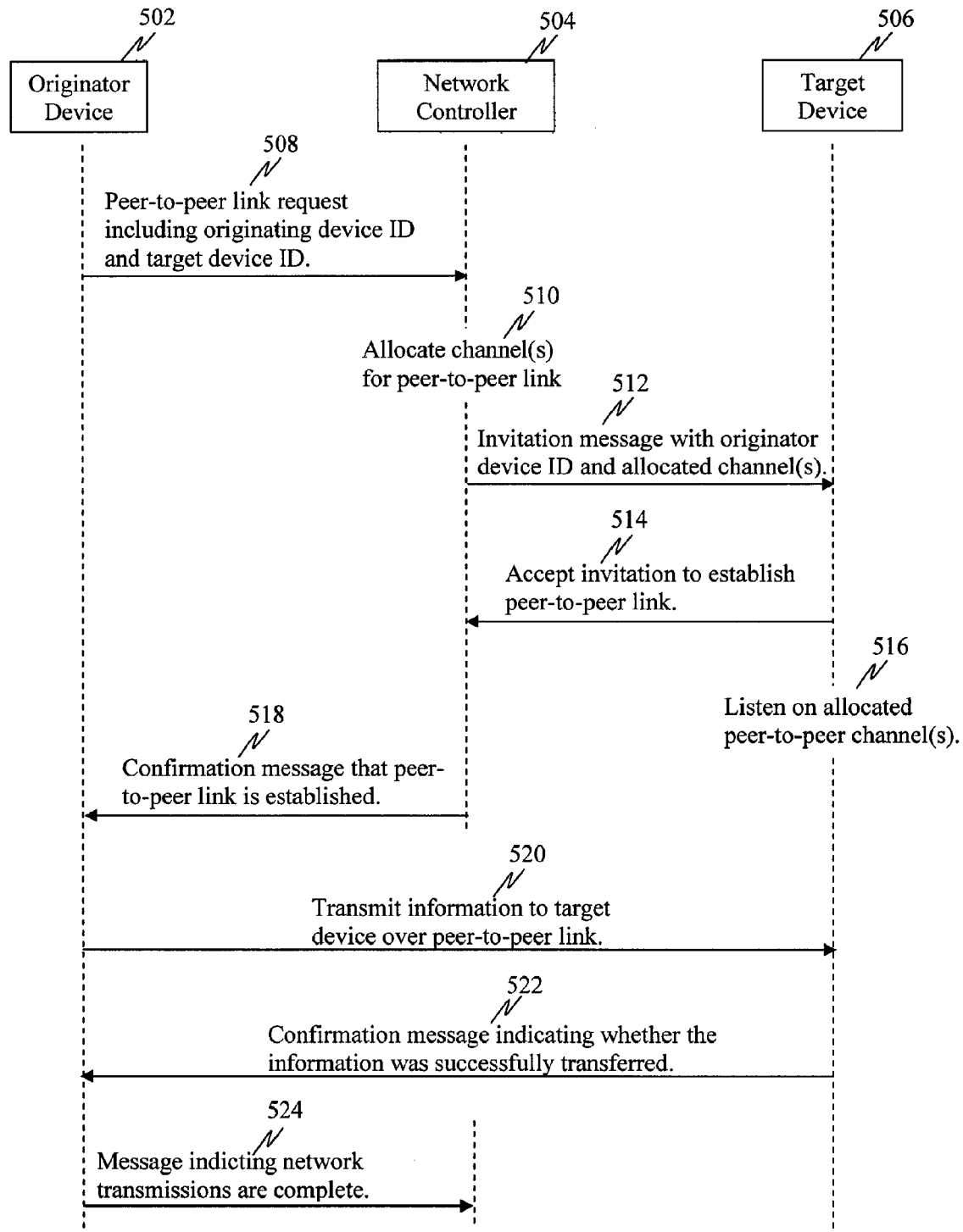
FIG. 5 illustrates an example of a request-response method for implementing a peer-to-peer communication link between two wireless devices.

FIG. 5 illustrates an example of a request-response method for implementing a peer-to-peer communication link between two wireless devices. An originator device 502 sends a peer-to-peer link request to the network controller 504 that includes the originating wireless device ID and a target wireless device ID 508. The network controller 504 then allocates a channel for the peer-to-peer link 510. An invitation message is then sent to the target wireless device with the originator device ID and the allocated channel 512. The target device 506 accepts the invitation 514 and starts listening to the allocated peer-to-peer channel(s) 516. The network controller 504 sends a confirmation message to the originating wireless device 502 that a peer-to-peer link has been established 518. This confirmation message may also provide the allocated peer-to-peer channel(s) to the originator device 502. The originator device 502 can then start a session on the peer-to-peer link by transmitting information to the target device 520. The target device 506 then sends a confirmation message indicating whether the information was successfully transferred 522. Originator device 502 may send a message to the network controller 504 indicating transmissions are complete 524.

In some implementations, data may also be transferred from the target device 506 to the originator device 502. For example, once a peer-to-peer link has been initiated by originator device 502 and is established, target device 506 may transmit data to originator 502. Alternatively, originator device 502 may request data from target device 506 and target device 506 then transmits the requested data over the peer-to-peer link. Thus, the peer-to-peer link may be used for one-way data transfer (e.g., from originator device to target device or from target device to originator device) and/or for two-way data transfer between two or more devices.

Figure 6:
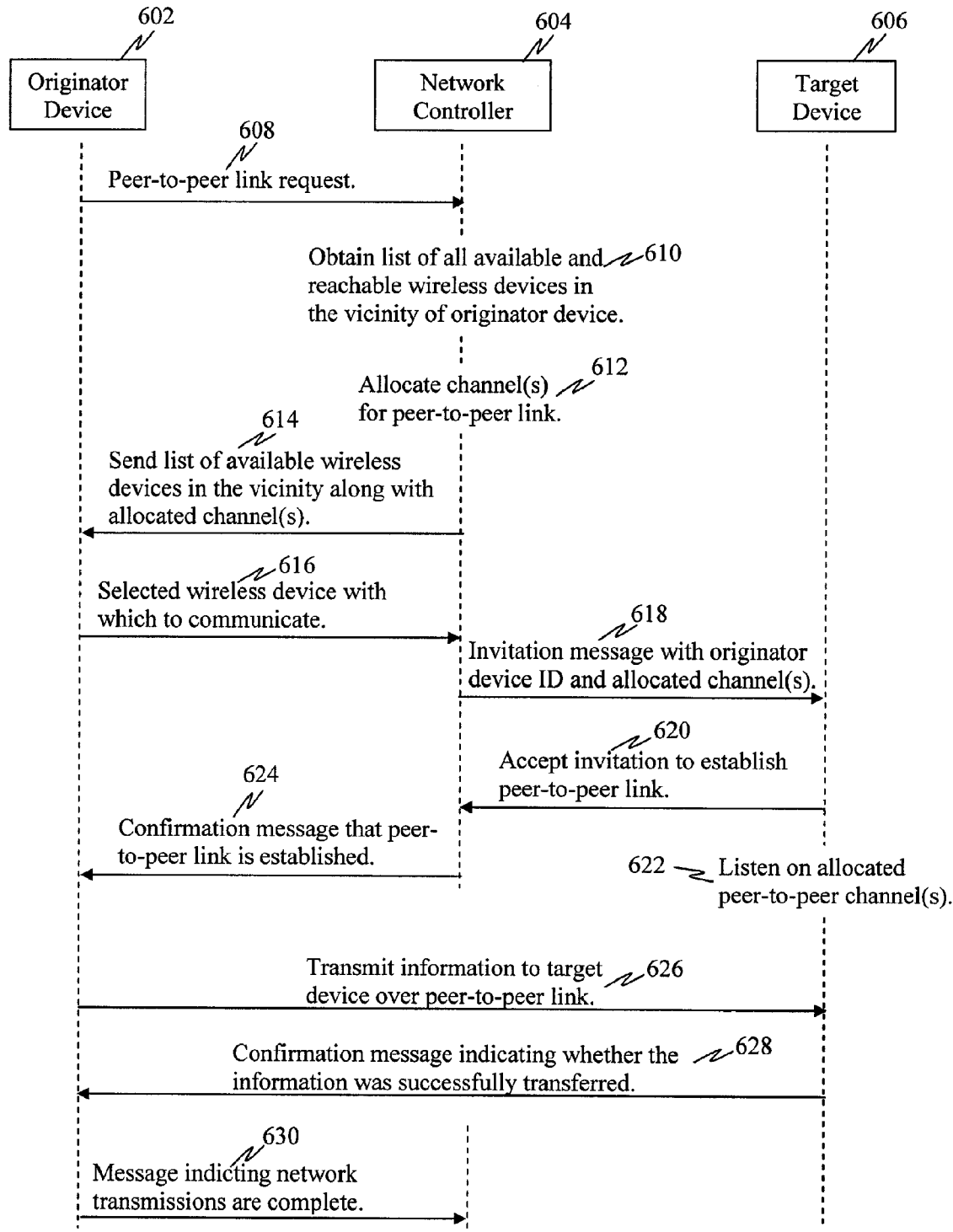
FIG. 6 illustrates an example of a peer-to-peer list method for implementing a peer-to-peer communication link between two wireless devices.

FIG. 6 illustrates an example of a peer-to-peer list method for implementing a peer-to-peer communication link between two wireless devices. In this method, an originator device 602 requests a peer-to-peer link 608 from a network controller 604. The network controller 604 obtains a list of all available and reachable wireless devices in the vicinity 610. The network controller 604 also allocates a channel(s) for the peer-to-peer link 612. The list is sent to the originator device 602 based on position location information collected by the network controller 604. For example, the network controller 604 may compare radio frequency signatures from different wireless devices and group devices together according to their geographical information. A group of wireless devices whose radio frequency signatures most closely match the originator device is sent to the originator device 614.

The originator device 602 then selects a target wireless device from the received list and sends it to the network controller 616. An invitation message is then sent to the target wireless device with the originator device ID and the allocated channel 618. The target device 606 accepts the invitation to establish a peer-to-peer link 620 with originator device 602 and starts listening to the allocated peer-to-peer channel(s) 622. The network controller 604 sends a confirmation message to the originator device 602 that a peer-to-peer link has been established 624. The originator device 602 can then start a session on the peer-to-peer link by transmitting information to the target device 626. Upon receiving the information from the originator device 602, the target device 606 may send a confirmation message indicating whether the information was successfully received 628. Originator device 602 may send a message to the network controller 604 indicating transmissions are complete 630.

One feature provides for the originator device to request a particular frequency or frequencies for the peer-to-peer channel. Since the peer-to-peer channel shares the communication spectrum with other wireless devices on the network, an originator device may scan channels (e.g., timeslots or uplink frequencies) to identify a frequency having no interference. One or more identified frequencies may then be requested from the network manager to establish a peer-to-peer session.

Alternatively, the originator device may scan or sense all channels to identify those channels that are available. The available channels are then reported to the network manager along with a request for a peer-to-peer channel request. The network manager checks the availability of the reported available channel resources and directs the originator and target devices to use the allocated frequency channel(s).

Yet another feature provides for multiple channels to be aggregated. The originator device may aggregate channels to increase the bandwidth of the peer-to-peer link, hence, increasing the data transfer rate.

The system and methods described in FIGS. 1, 4, and 5 may also enable a network controller to monitor the length of each peer-to-peer session, thus enabling service providers to charge users for such sessions. For example, the network manager knows when a peer-to-peer channel is allocated and deallocated and the devices involved in the peer-to-peer session.

Figure 7:
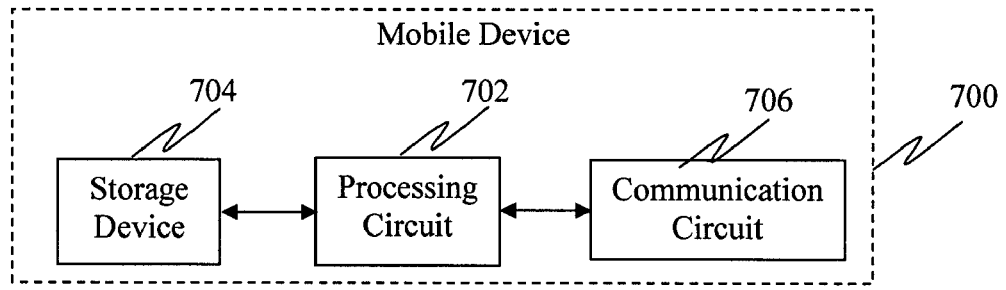
FIG. 7 is a block diagram illustrating an example of a mobile device that may be configured to communicate over a peer-to-peer link.

FIG. 7 is a block diagram illustrating an example of a mobile device that may be configured to communicate over a peer-to-peer link. Mobile device 700 may operate as an originator device (e.g., device that requests the peer-to-peer channel) and/or a target device (e.g., device that receives data from the originator device). Mobile device 700 includes a processing circuit 702 coupled to a data storage device 704 and a communication circuit 706. Processing circuit 702 may be configured to initiate a peer-to-peer channel (i.e., when operating as an originator device) or to accept an invitation to establish a peer-to-peer channel (i.e., when operating as a target device). For example, when operating as an originator device, data stored in storage device 704 may be sent via communication circuit 702 from mobile device 700 to a target device.

Figure 8:
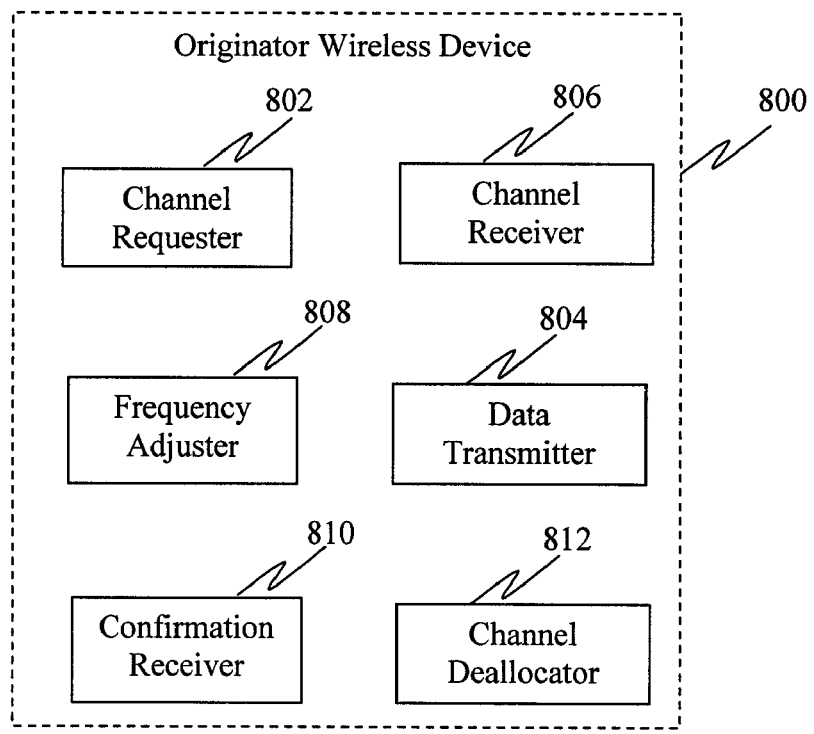
FIG. 8 is a block diagram illustrating examples of functional components of an originator wireless device configured to communicate over a peer-to-peer channel.

FIG. 8 is a block diagram illustrating an example of functional components of an originator wireless device 800 configured to communicate over a peer-to-peer channel. The originator wireless device 800 includes a channel requester 802 for requesting a peer-to-peer channel for communicating directly with a target wireless device, a channel receiver 806 for obtaining the peer-to-peer channel from a wireless network manager, and a data transmitter 804 for transferring data through the peer-to-peer channel directly to the target wireless device. Additionally, where the originator wireless device 800 is configured for FDD operation, it includes a frequency adjuster 808 for adjusting its receive frequency to receive on the uplink channel frequency when operating in peer-to-peer mode and receiving on a downlink channel frequency otherwise. A confirmation receiver 810 may receive confirmation from the target wireless device that the transferred data was received and a channel deallocator 812 notifies the network manager that the peer-to-peer channel can be deallocated.

Consequently, a wireless communication device is provided comprising (a) means for requesting a peer-to-peer channel for communicating directly with a target wireless device, (b) means for obtaining the peer-to-peer channel from a wireless network manager, and (c) means for transferring data through the peer-to-peer channel directly to the target wireless device. Additionally, the wireless communication device may also comprise: (d) means for transmitting on an uplink channel frequency, and (e) means for receiving on the uplink channel frequency when operating in peer-to-peer mode and on a downlink channel frequency otherwise. The wireless communication device may also include (f) means for receiving confirmation from the target wireless device that the transferred data was received; and (g) means for notifying the network manager that the peer-to-peer channel can be deallocated.

Figure 9:
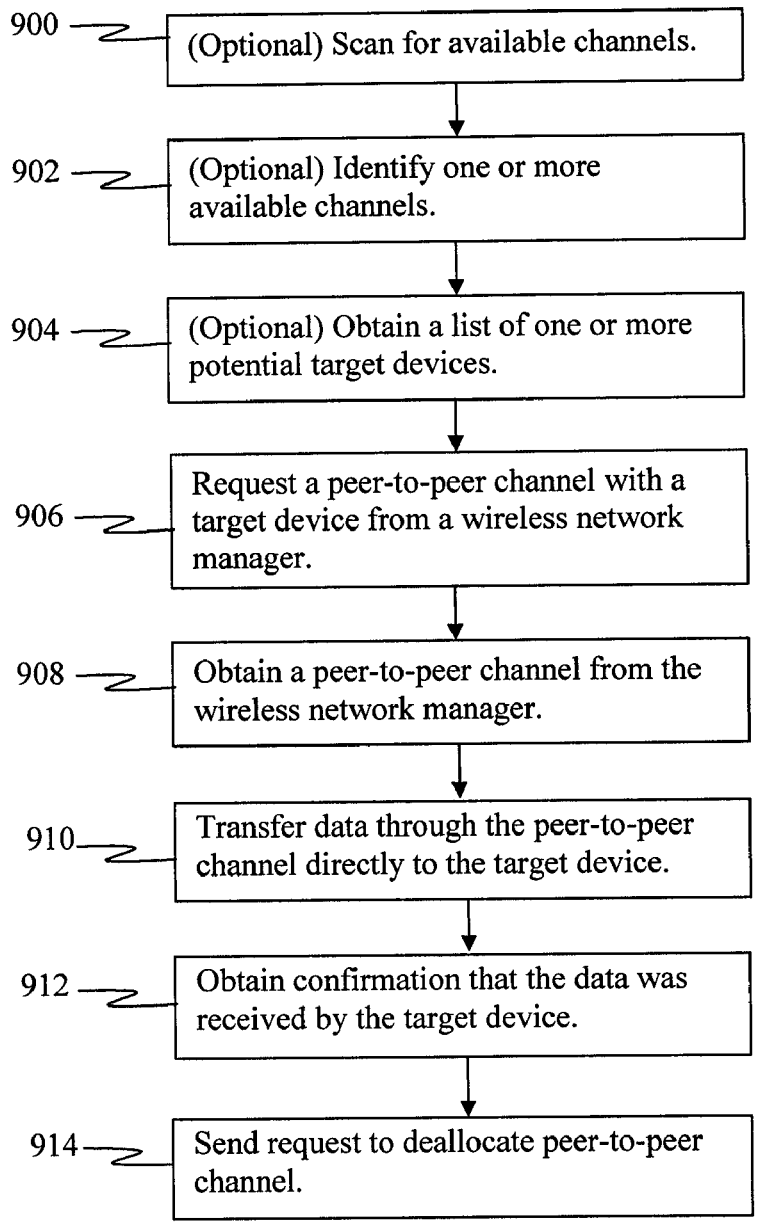
FIG. 9 illustrates an example of a method operational on an originator mobile device configured to setup and transmit data over a peer-to-peer channel.

FIG. 9 illustrates an example of a method operational on an originator mobile device configured to setup and transmit data over a peer-to-peer channel. The originator mobile device may scan for available channels 900 and identify one or more available channels 902. Additionally, it may obtain a list of one or more potential target devices 904. A peer-to-peer channel is then requested with a target device from a wireless network manager 906. A peer-to-peer channel is then obtained from the wireless network manager 908. In some implementations, one or more channels may be aggregated into the peer-to-peer channel to increase system bandwidth.

Data is transferred through the peer-to-peer channel to the target device 910. Confirmation is obtained or received that the data was received by the target device 912. A request is then sent to deallocate or terminate the peer-to-peer channel 914.

Figure 10:
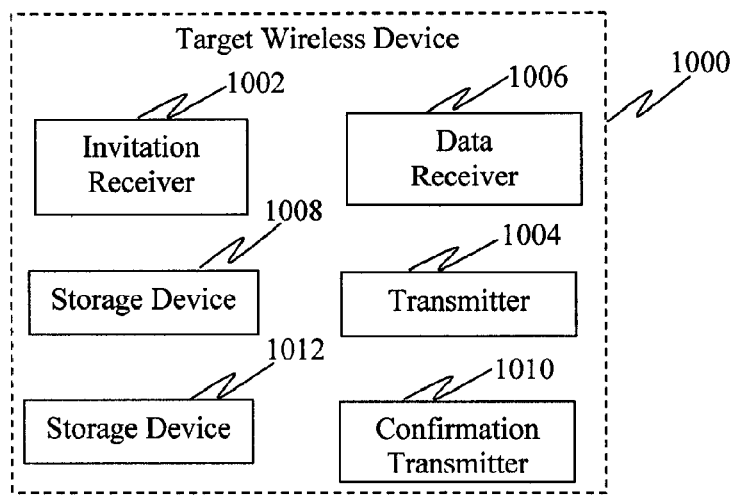
FIG. 10 is a block diagram illustrating examples of functional components of a target wireless device 1000 configured to communicate over a peer-to-peer channel.

FIG. 10 is a block diagram illustrating examples functional components of a target wireless device 1000 configured to communicate over a peer-to-peer channel. The target wireless device 1000 includes an invitation receiver 1002 for receiving an invitation from a network manager to setup a peer-to-peer channel with an originator wireless device, a transmitter 1004 for sending a reply to the network manager accepting the invitation, and a data receiver 1006 for receiving data through the peer-to-peer channel directly from the originator device. The target wireless device 1000 may also include a storage device 1008 for storing the received data locally and a confirmation transmitter 1010 for sending confirmation to the originator wireless device that the data was received. Additionally, where the target mobile device 1000 is configured for FDD operation, it includes a frequency adjuster 1012 for adjusting the frequency on which the target mobile device receives from a downlink channel frequency to an uplink channel frequency.

Consequently, a wireless communication device is provided, comprising: (a) means for receiving an invitation from a network manager to setup a peer-to-peer channel with an originator wireless device; (b) means for sending a reply to the network manager accepting the invitation; and (c) means for receiving data through the peer-to-peer channel directly from the originator device. The wireless communication device may additionally include (d) means for storing the received data locally; and (e) means for sending confirmation to the originator wireless device that the data was received. Additionally, where the target mobile device 1000 is configured for FDD operation, it includes means for adjusting the frequency on which the target mobile device receives from a downlink channel frequency to an uplink channel frequency.

Figure 11:
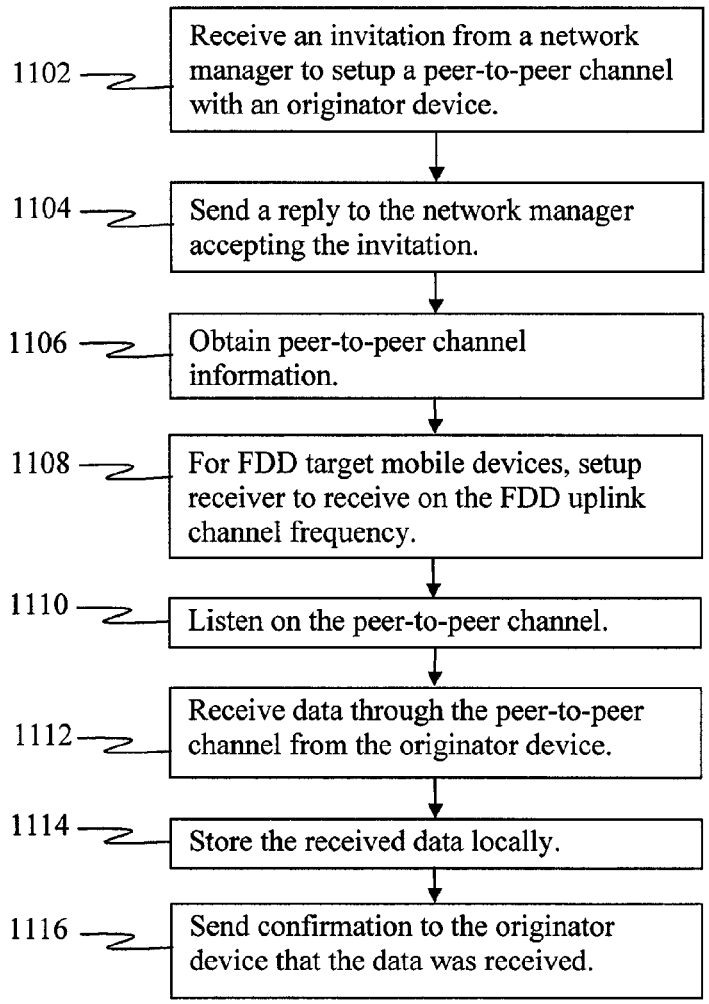
FIG. 11 illustrates an example of a method operational on a target mobile device configured to receive data over a peer-to-peer channel.

FIG. 11 illustrates an example of a method operational on a target mobile device configured to receive data over a peer-to-peer channel. An invitation is received from a network manager to setup a peer-to-peer channel with an originator device 1102. A reply is sent to the network manager accepting the invitation 1104. The peer-to-peer channel information is then obtained 1106. Optionally, where the target mobile device is FDD-enabled, its receiver is setup to receive on its FDD uplink channel frequency 1108. The target mobile device then listens on the peer-to-peer channel 1110. Data is received through the peer-to-peer channel from the originator device 1112 and stored locally 1114. Confirmation is sent to the originator device that the data was received 1116.

Figure 12:
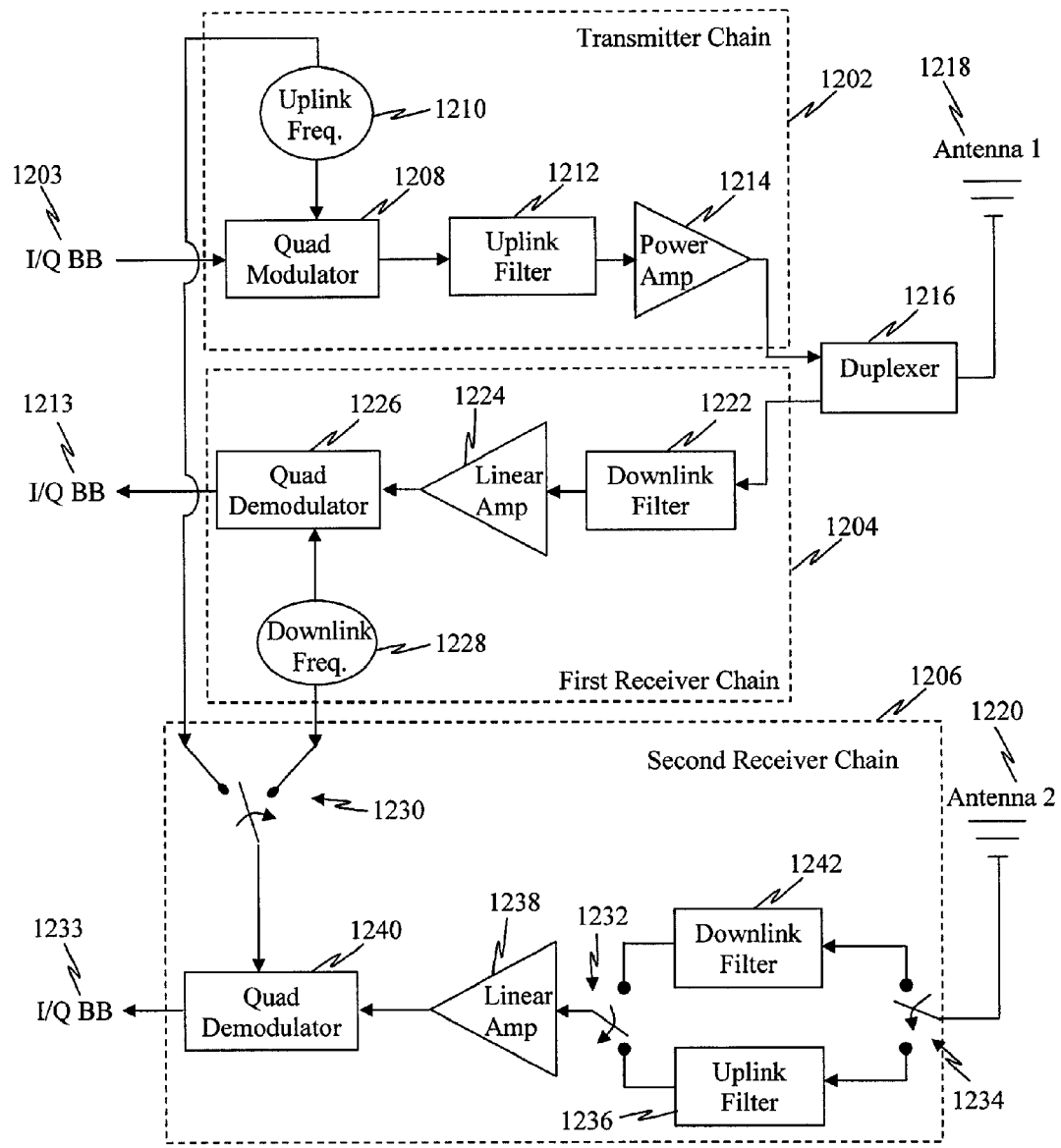
FIG. 12 is a block diagram illustrating an example of a communication circuit of a FDD-enabled mobile device adapted for receiving over a peer-to-peer channel.

FIG. 12 is a block diagram illustrating an example of a communication circuit of a FDD-enabled mobile device adapted for receiving over a peer-to-peer channel. The communication circuit includes a transmitter chain 1202 and diversity receiver chains 1204 and 1206.

The transmitter chain 1202 includes a quadrature modulator 1208 that modulates a received baseband signal I/Q BB 1203 using an uplink frequency from uplink oscillator 1210. An uplink filter 1212 filters the resulting signal from the quadrature modulator 1208. The signal is then amplified by a power amplifier 1214 and sent to a duplexer 1216 from where it is transmitted over antenna 1218.

In order to better receive a signal that may take different paths, a diversity receiver architecture is used having two receiver chains 1204 and 1206 and two antennas 1218 and 1220, respectively. A first receiver chain 1204 receives a signal from the duplexer 1216, filters it using a downlink filter 1222, amplifies the filtered signal using a linear amplifier 1224, and demodulates it using a quadrature demodulator 1226 using the downlink frequency from downlink oscillator 1228 to obtain the received baseband signal I/Q BB 1213.

Since FDD-enabled mobile devices do not receive on the uplink frequency, the second receiver chain 1206 is reconfigured to receive on both the downlink frequency 1228 and the uplink frequency 1210. This is accomplished by switches 1230, 1232, and 1234 that cause the second receiver chain 1206 to receive on either the uplink frequency (when operating on peer-to-peer mode) or the downlink frequency (when operating in FDD mode). When operating in peer-to-peer mode, a signal 1220 is received on antenna 2, filtered through an uplink filter 1236 (configured allow the uplink frequency to pass), amplified by a linear amplifier 1238, and demodulated by a quadrature demodulator 1240 using the uplink frequency from uplink oscillator 1210 to obtain the baseband signal I/Q BB 1233. Alternatively, when operating in FDD mode, the signal 1220 received on antenna 2 is filtered through a downlink filter 1242 (configured allow the uplink frequency 1210 to pass), amplified by a linear amplifier 1238, and demodulated by the quadrature demodulator 1040 using the downlink frequency from downlink oscillator 1210 to obtain the baseband signal I/Q BB 1233. Thus, depending on its mode of operation, the second receiver chain 1206 is tuned to either the uplink frequency or the downlink frequency.

In one implementation, the waveform transmitted by a mobile device operating in peer-to-peer mode resembles the downlink waveform from a base station or node B. This way, there is no need to change the way a receiving mobile device processes a received signal over the peer-to-peer channel. Typically, adding a transmit waveform generating section is considered easier than changing the receive section of the mobile. In alternative implementations, other types of waveforms may be used instead by configuring mobile devices to generate and receive such waveforms.

Thus, by reusing existing radios and allocated spectrums to implement a peer-to-peer link, there is no need for additional radios, the uplink spectrum is used efficiently, and existing hardware is reused.

Figure 13:
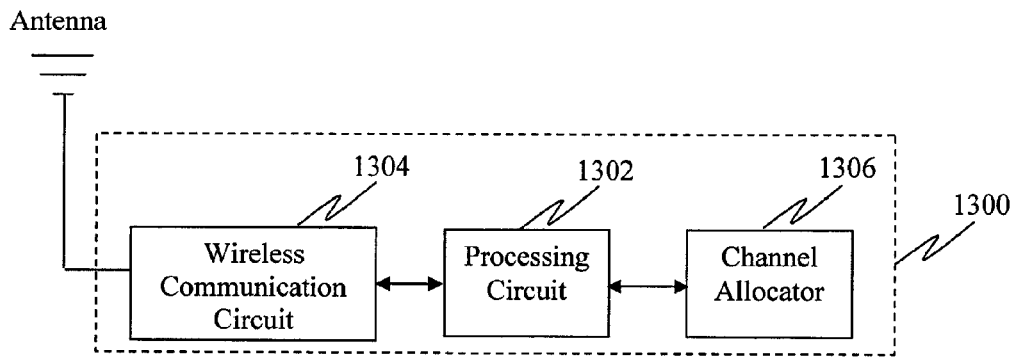
FIG. 13 is a block diagram illustrating examples functional components of a network manager configured to facilitate a direct peer-to-peer link between two or more mobile device.

FIG. 13 is a block diagram illustrating examples functional components of a network manager 1300 configured to facilitate a direct peer-to-peer link between two or more mobile device. The network manager 1300 includes a processing circuit 1302 coupled to a wireless communication circuit 1304 and a channel allocator 1306. The network manager 1300 may be a base station, network controller, other network infrastructure devices, or a combination thereof. The processing circuit 1302 may be configured to receive messages from the wireless communication circuit 1304 requesting a peer-to-peer link between an originator wireless device and a target wireless device. The processing circuit 1302 obtains a channel (e.g., one or more available frequencies and/or timeslots) from the channel allocator 1306 and allocates it to the peer-to-peer link. In various implementations, the network manager may operate as described with relation to FIGS. 1, 5, and/or 6.

Figure 14:
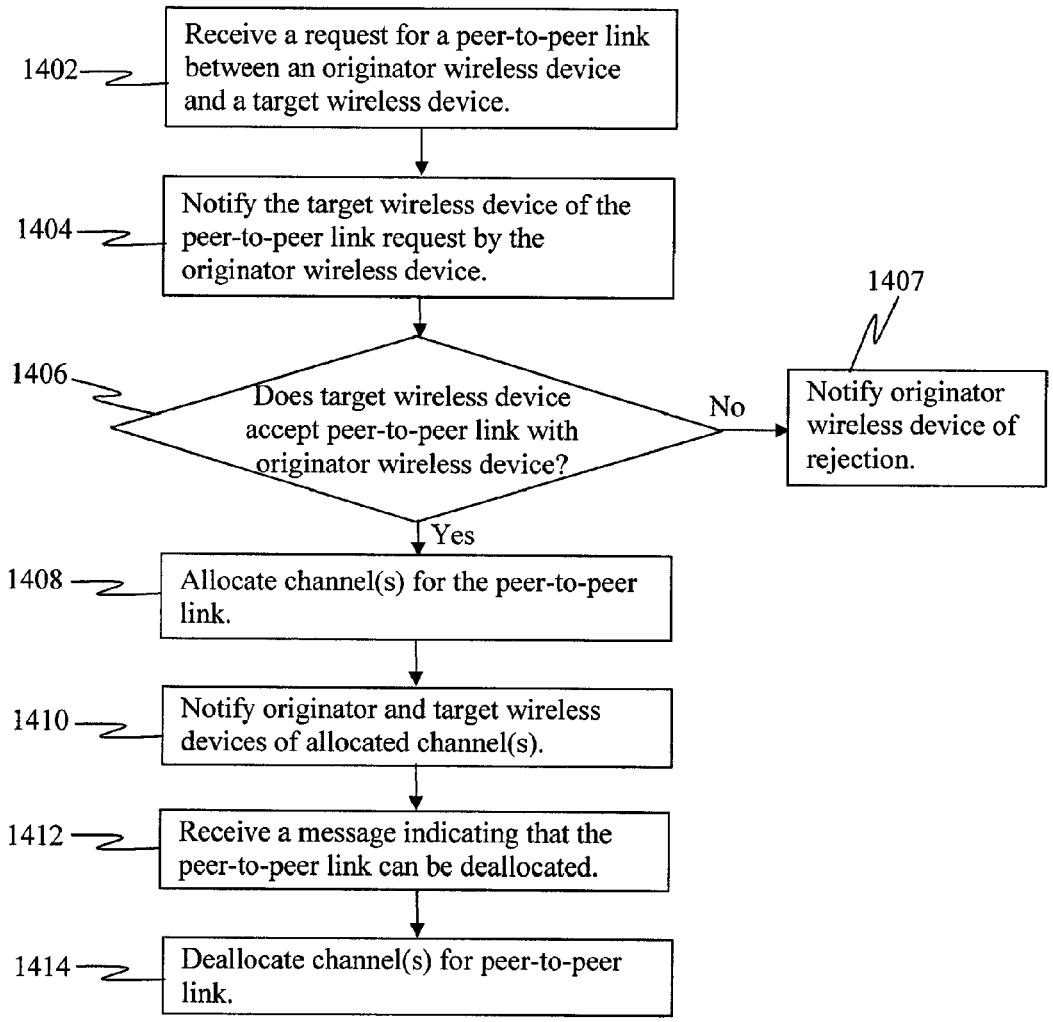
FIG. 14 illustrates an example of a method operational on a network manager device configured to establish a peer-to-peer channel through which two or more mobile devices can communicate directly.

FIG. 14 illustrates an example of a method operational on a network manager device (e.g., base station, Node B) configured to establish a peer-to-peer channel through which two or more mobile devices can communicate directly. A request is received for a peer-to-peer link between an originator wireless device and a target wireless device 1402. The target wireless device is notified by the network manager of the peer-to-peer link request by the originator wireless device 1404. The network manager determines whether the target wireless device has accepted the peer-to-peer link with originator wireless device 1406. That is, the network manager may receive either an acceptance or denial message from the target wireless device. If a denial message is received, the network manager notifies the originator wireless device of the rejection 1407. Otherwise, if the target wireless device accepts the peer-to-peer link with the originator wireless device, one or more channels are allocated for the for the peer-to-peer link 1408. The originator and target wireless devices are then notified of the allocated channel(s) to use for the peer-to-peer link 1410.

Once the originator and target wireless devices have finished using the peer-to-peer link, a message is received by the network manager indicating that the peer-to-peer link can be deallocated 1412. The network manager then deallocates the channel(s) for the peer to peer link 1414 so they can be reused.

One or more of the steps and functions illustrated in FIGS. 1, 2, 3, 4, 5, 6, 7, 8, 9, 10, 11, 12, 13 and/or 14 may be rearranged and/or combined into a single step or embodied in several steps without departing from the invention. Additional components and/or steps may also be added without departing from the invention. The apparatus, devices, and/or components illustrated in FIGS. 1, 4, 7, 8, 10, 12 and/or 13 may be configured to perform the methods, features, or steps illustrated in FIGS. 5, 6, 9, 11 and/or 14.

The foregoing examples and configurations are merely examples and are not to be construed as limiting the invention. The description of the examples and configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method comprising:
sending, by an originator wireless device to a base station, a peer-to-peer link request for time division duplex (TDD) communications, wherein the originator wireless device includes a first diversity receiver and a second diversity receiver, wherein the first diversity receiver is configurable to receive first signals using a first frequency of a downlink frequency band of a frequency division duplex (FDD) network, and wherein the second diversity receiver is configurable to receive second signals using the first frequency when the second diversity receiver is in a first mode and using a second frequency of an uplink frequency band of the FDD network when the second diversity receiver is in a second mode;
receiving from the base station a list of potential target wireless devices available for peer-to-peer-communication with the originator wireless device;
selecting a target wireless device from the list;
sending to the base station a first message indicating the selection of the target wireless device;
receiving a second message from the base station, the second message indicating that a peer-to-peer channel has been allocated and reserved for the originator wireless device and the target wireless device, wherein the peer-to-peer channel corresponds to a frequency that is included in the uplink frequency band;
configuring the second diversity receiver to receive the second signals using the frequency that corresponds to the peer-to-peer channel;
transferring data directly to the target wireless device via the peer-to-peer channel;
and after transferring the data, sending a third message to the base station, the third message indicating that the peer-to-peer channel is to be deallocated.

2. The method of claim 1, wherein the peer-to-peer channel corresponds to an uplink channel of a FDD wireless device and is used for receiving and transmitting.

3. The method of claim 1, wherein the originator wireless device is a cellular phone.

4. The method of claim 1, wherein the target wireless device includes at least one of a computer, a cellular phone, a personal digital assistant, an audio device, a video device, a camera, a display device, a printer, or a digital storage device.

5. The method of claim 1, further comprising
scanning for and identifying, at the originator wireless device, one or more available channels of the uplink frequency band; and
after the one or more available channels are identified, requesting, by the originator device to the base station, at least one of the one or more available channels for the peer-to-peer channel.

6. The method of claim 1, wherein transferring the data includes transferring backup data according to a prearranged agreement related to backing up information between the originator wireless device and the target wireless device.

7. The method of claim 6, wherein the prearranged agreement related to backing up the information between the originator wireless device and the target wireless device is established prior to the peer-to-peer link being allocated and reserved for the originator wireless device and the target wireless device.

8. The method of claim 1, further comprising receiving, at the originator wireless device, confirmation from the target wireless device, wherein the third message is sent from the originator wireless device to the base station in response to receiving the confirmation.

9. The method of claim 1, further comprising aggregating multiple channels to form the peer-to-peer channel.

10. The method of claim 1, wherein the peer-to-peer channel is configured to enable TDD and FDD wireless devices to communicate.

11. The method of claim 1, wherein an uplink channel of FDD communications using the peer-to-peer channel and a downlink channel of the TDD communications using the peer-to-peer channel are paired according to a substantially same frequency.

12. The method of claim 1, further comprising:
    establishing the peer-to-peer communication between the originator wireless device and the target wireless device;
    sending a request to the target wireless device requesting the target wireless device to back up the data of the originator wireless device; and
    determining that the target wireless device accepts the request to back up the data, wherein the data is transferred directly to the target wireless device in response to determining that the target wireless device accepts the request to back up the data.

13. The method of claim 1, wherein the first diversity receiver includes a first uplink filter, wherein the second diversity receiver includes a second uplink filter and a downlink filter, wherein the second diversity receiver is configurable to receive via the downlink filter or to receive via the second uplink filter, wherein the downlink filter is associated with the first frequency, and wherein the second uplink filter is associated with the second frequency.

14. An apparatus comprising:
    a wireless transceiver including a first diversity receiver and a second diversity receiver, wherein the first diversity receiver is configurable to receive first signals using a first frequency of a downlink frequency band of a frequency division duplex (FDD) network, and wherein the second diversity receiver is configurable to receive second signals using the first frequency when the second diversity receiver is in a first mode and using a second frequency of an uplink frequency band of the FDD network when the second diversity receiver is in a second mode;
    and a processor coupled to the wireless transceiver, the processor configured to:
    send a peer-to-peer link request to a base station for time division duplex (TDD) communications;
    receive from the base station a list of potential target wireless devices available for peer-to-peer-communication;
    select a target wireless device from the list;
    send to the base station a first message indicating the selection of the target wireless device;
    receive a second message from the base station, the second message indicating that a peer-to-peer channel has been allocated and reserved for the peer-to-peer communication with the target wireless device, wherein the peer-to-peer channel corresponds to a frequency that is included in the uplink frequency band;
    configure the second diversity receiver to receive the second signals using the frequency that corresponds to the peer-to-peer channel;
    transfer data directly to the target wireless device via the peer-to-peer channel;
    and after the data is transferred, send a third message to the base station, the third message indicating that the peer-to-peer channel is to be deallocated.

15. The apparatus of claim 14, wherein the wireless transceiver is configured to communicate on the FDD network, the wireless transceiver further including a transmitter circuit tuned to transmit on the first frequency.

16. The apparatus of claim 14, wherein the processor is further configured to identify one or more potential target wireless devices indicated by the list and to select the target wireless device from the one or more potential target wireless devices.

17. The apparatus of claim 14, wherein an uplink channel of FDD communications using the peer-to-peer channel and a downlink channel of the TDD communications using the peer-to-peer channel are paired according to a substantially same frequency.

18. The apparatus of claim 14, wherein the processor is further configured to transfer voice data via the peer-to-peer channel directly to the target wireless device.

19. The apparatus of claim 14, wherein the wireless transceiver further includes a transmitter, wherein the transmitter is configurable to transmit on the second frequency.

20. A device comprising:
    means for sending to a base station a peer-to-peer link request for time division duplex (TDD) communications;
    means for receiving from the base station a list of potential target wireless devices available for peer-to-peer-communication;
    means for selecting a target wireless device from the list;
    means for sending to the base station a first message indicating the selection of the target wireless device;
    means for receiving a second message from the base station, the second message indicating that a peer-to-peer channel has been allocated and reserved for the and peer-to-peer communication the target wireless device, wherein the peer-to-peer channel corresponds to a frequency included in an uplink frequency band of a frequency division duplex (FDD) network;
    means for configuring a wireless transceiver based on the second message, wherein the wireless transceiver includes a first diversity receiver and a second diversity receiver, wherein the first diversity receiver is configurable to receive first signals using a first frequency of a downlink frequency band of the FDD network, wherein the second diversity receiver is configurable to receive second signals using either the first frequency or a second frequency of the uplink frequency band of the FDD network, and wherein the second diversity receiver is configurable to receive second signals using the first frequency when the second diversity receiver is in a first mode and using a second frequency of an uplink frequency band of the FDD network when the second diversity receiver is in a second mode;
    means for transferring data directly to the target wireless device via the peer-to-peer channel;
    and means for sending a third message to the base station after the data is transferred, the third message indicating that the peer-to-peer channel is to be deallocated.

21. The device of claim 20, further comprising means for receiving confirmation from the target wireless device confirming transfer of the data, wherein the means for sending the third message is responsive to the means for receiving the confirmation.

22. The device of claim 20, wherein an uplink channel of FDD communications using the peer-to-peer channel and a downlink channel of the TDD communications using the peer-to-peer channel are paired according to a substantially same frequency.

23. The device of claim 20, wherein the means for transferring data includes means for transferring voice data via the peer-to-peer channel directly to the target wireless device.

24. A non-transitory machine-readable medium storing one or more instructions that, in response to execution by a processor, causes the processor to:
   send, from an originator wireless device to a base station: a peer-to-peer link request for time division duplex (TDD) communications, wherein the originator wireless device includes a first diversity receiver and a second diversity receiver, wherein the first diversity receiver is configurable to receive first signals using a first frequency of a downlink frequency band of a frequency division duplex (FDD) network, and wherein the second diversity receiver is configurable to receive second signals using the first frequency when the second diversity receiver is in a first mode and using a second frequency of an uplink frequency band of the FDD network when the second diversity receiver is in a second mode;
   receive from the base station a list of potential target wireless devices available for peer-to-peer-communication with the originator wireless device;
   select a target wireless device from the list;
   send to the base station a first message indicating the selection of the target wireless device;
   receive a second message from the base station, the second message indicating that a peer-to-peer channel has been allocated and reserved for the originator wireless device and the target wireless device, wherein the peer-to-peer channel correspond to a frequency included in the uplink frequency band;
   configure, based on the second message, the second diversity receiver to receive the second signals using the frequency;
   transfer data directly to the target wireless device via the peer-to-peer channel;
   and send a third message to the base station after the data is transferred, the third message indicating that the peer-to-peer channel is to be deallocated.

25. The non-transitory machine-readable medium of claim 24, further storing one or more instructions that, in response to execution by a processor, causes the processor to:
   scan for available channels;
   identify one or more available channels; and
   request at least one of the one or more available channels for the peer-to-peer channel by indicating the one of the one or more available channels in the peer-to-peer link request.

26. A method performed by a target wireless device for communicating in a wireless network, the method comprising:
   receiving an invitation from a network manager device to communicate data with an originator wireless device using a peer-to-peer channel for time division duplex (TDD) communication, wherein the invitation identifies an uplink frequency of an uplink frequency band of a frequency division duplex (FDD) network, and wherein the peer-to-peer channel corresponds to the uplink frequency;
   sending a reply to the network manager device accepting the invitation;
   configuring reconfiguring a receiver wireless transceiver of the target wireless device based on the uplink frequency, wherein the wireless transceiver includes a first diversity receiver and a second diversity receiver, wherein the first diversity receiver is configurable to receive first signals using a first frequency included in a downlink frequency band of the FDD network, wherein the second diversity receiver is configurable to receive second signals using the first frequency when the second diversity receiver is in a first mode and using a second frequency of an uplink frequency band when the second diversity receiver is in a second mode, and wherein configuring the wireless transceiver includes configuring the second receiver to receive the second signals using the uplink frequency;
   and receiving the data via the peer-to-peer channel directly from the originator wireless device.

27. The method of claim 26, further comprising:
   storing the data at the target wireless device; and
   sending confirmation to the originator wireless device that the data was received.

28. The method of claim 26, wherein an uplink channel of FDD communications using the peer-to-peer channel and a downlink channel of the TDD communications using the peer-to-peer channel are paired according to a substantially same frequency.

29. The method of claim 26, wherein receiving the data includes receiving voice data via the peer-to-peer channel directly from the originator wireless device.

30. A device comprising:
   means for receiving an invitation from a network manager device to communicate data with an originator wireless device using a peer-to-peer channel for time division duplex (TDD) communication, wherein the invitation identifies an uplink frequency of an uplink frequency band of a frequency division duplex (FDD) network, and wherein the peer-to-peer channel corresponds to the uplink frequency;
   means for sending a reply to the network manager device accepting the invitation;
   means for configuring a wireless transceiver based on the invitation, wherein the wireless transceiver includes a first diversity receiver and a second diversity receiver, wherein the first diversity receiver is configurable to receive first signals using a first frequency included in a downlink frequency band of the FDD network, wherein the second diversity receiver is configurable to receive second signals using the first frequency when the second diversity receiver is in a first mode and using a second frequency included in the uplink frequency band, and wherein the means for configuring the wireless transceiver configures the second diversity receiver to receive the second signals using the uplink frequency when the second diversity receiver is in a second mode; and
   means for storing the data received via the second diversity receiver, wherein the data is received via the peer-to-peer channel.

31. The device of claim 30, further comprising means for sending confirmation to the originator wireless device that the data was received.

32. The device of claim 30, wherein an uplink channel of FDD communications using the peer-to-peer channel and a downlink channel of the TDD communications using the peer-to-peer channel are paired according to a substantially same frequency.

33. A device comprising a processing circuit configured to:
   receive an invitation, from a network manager device, to communicate data with an originator wireless device using a peer-to-peer channel for time division duplex (TDD) communication, wherein the invitation identifies an uplink frequency of an uplink frequency band of a frequency division duplex (FDD) network, and wherein the peer-to-peer channel corresponds to the uplink frequency;

send a reply to the network manager device accepting the invitation;
configure a wireless transceiver based on the invitation, wherein the wireless transceiver includes a first diversity receiver and a second diversity receiver, wherein the first diversity receiver is configurable to receive first signals using a first frequency included in a downlink frequency band of the FDD network, wherein the second diversity receiver is configurable to receive second signals using the first frequency when the second diversity receiver is in a first mode and using a second frequency of an uplink frequency band when the second diversity receiver is in a second mode, and wherein configuring the wireless transceiver based on the invitation includes configuring the second diversity receiver to receive the second signals using the uplink frequency reconfigure from receiving using an FDD downlink channel to receiving using an FDD uplink channel; and
receive the data via the second diversity receiver, wherein the data is received directly from the originator wireless device via the peer-to-peer channel.

34. The device of claim 33, wherein the peer-to-peer channel is further associated with a timeslot.

35. A non-transitory machine-readable medium storing one or more instructions, which, in response to execution by a processor, causes the processor to:
receive an invitation, from a network manager device, to communicate data with an originator wireless device using a peer-to-peer channel for time division duplex (TDD) communication, wherein the invitation identifies an uplink frequency of an uplink frequency band of a frequency division duplex (FDD) network, and wherein the peer-to-peer channel corresponds to the uplink frequency;
send a reply to the network manager device accepting the invitation;
configure a wireless transceiver based on the invitation, wherein the wireless transceiver includes a first diversity receiver and a second diversity receiver, wherein the first diversity receiver is configurable to receive first signals using a first frequency included in a downlink frequency band of the FDD network, wherein the second diversity receiver is configurable to receive second signals using the first frequency when the second diversity receiver is in a first mode and using a second frequency of an uplink frequency band when the second diversity receiver is in a second mode, and wherein configuring the wireless transceiver based on the invitation includes configuring the second diversity receiver to receive the second signals using the uplink frequency reconfigure from receiving using a frequency division duplex (FDD) downlink channel to receiving using an FDD uplink channel;
and receive the data via the second diversity receiver, wherein the data is received via the peer-to-peer channel directly from the originator wireless device.

36. The non-transitory machine-readable medium of claim 35, further storing one or more instructions which, in response to execution by the processor, causes the processor to:
store the data; and
send confirmation to the originator wireless device that the data was received.

37. A method performed by a wireless network manager device for establishing peer-to-peer communications between wireless devices, the method comprising:
receiving a peer-to-peer link request for time division duplex (TDD) communications from an originator wireless device, wherein the originating wireless device includes a first diversity receiver and a second diversity receiver, wherein the first diversity receiver is configurable to receive first signals using a first frequency of a downlink frequency band of a frequency division duplex (FDD) network and wherein the second diversity receiver is configurable to receive second signals using the first frequency when the second diversity receiver is in a first mode and using a second frequency of an uplink frequency band of the FDD network when the second diversity receiver is in a second mode;
generating a list of available and reachable wireless devices in proximity to the originator wireless device;
sending the list to the originator wireless device, receiving from the originator wireless device a selection of an indicated device from the list as a target wireless device; and
allocating a channel for a peer-to-peer link between the originator wireless device and the target wireless device, wherein the second diversity receiver is configured to receive second signals using a frequency that corresponds to the channel;
receiving a deallocation message associated with the peer-to-peer link, wherein the deallocation message is received from the originator wireless device or the target wireless device; and
storing one or more time indicators associated with an allocation of the peer-to-peer link, associated with a deallocation of the peer-to-peer link, or a combination thereof.

38. The method of claim 37, further comprising:
notifying the target wireless device of the request for the peer-to-peer link by the originator wireless device; and
determining whether the request for the peer-to-peer link is acceptable to the target wireless device.

39. The method of claim 38, further comprising notifying the originator wireless device that the target wireless device has accepted the peer-to-peer link.

40. The method of claim 37, further comprising:
identifying radio frequency (RF) signatures from wireless devices;
comparing the RF signatures to a particular RF signature associated with the originator wireless device; and
selecting a subset of the wireless devices having RF signatures that match the particular RF signature of the originator wireless device,
wherein the list of available and reachable wireless devices corresponds to the subset of the wireless devices.

41. The method of claim 40, wherein each wireless device of the subset is further selected based on geographical information corresponding to a position of the wireless device being in proximity to the originator wireless device.

42. The method of claim 37, wherein the deallocation message indicates that the peer-to-peer channel is to be deallocated, and further comprising deallocating the channel for the peer-to-peer link based on the deallocation message.

43. The method of claim 37, wherein the channel is a cellular channel, and wherein allocating the channel comprises temporarily reassigning the cellular channel for short-range, high-speed communications between the originator wireless device and the target wireless device.

44. The method of claim 37, storing the one or more time indicators enables the wireless network manager device to monitor a duration of a peer-to-peer communication session between the originator wireless device and the target wireless device.

45. The method of claim 37, further comprising determining an amount of time that the peer-to-peer link was allocated based on the one or more time indicators.

46. The method of claim 37, further comprising providing the one or more time indicators to a service provider associated with the originator wireless device or the target wireless device.

47. The method of claim 37, wherein the one or more time indicators enable a service provided associated with the originator wireless device or the target wireless device to charge the originator wireless device or the target wireless device for use of the peer-to-peer link.

48. The method of claim 37, wherein the one or more time indicators are associated with one or more identifiers corresponding to the originator wireless device, the target wireless device, or a combination thereof.

49. The method of claim 37, wherein allocating the channel includes reserving the channel for peer-to-peer communications between the originator wireless device and the target wireless device.

50. The method of claim 37, further comprising notifying the originator wireless device, the target wireless device, or a combination thereof, of the channel for the peer-to-peer link.

51. A device comprising:
a wireless communication circuit to communicate with wireless devices on a network;
and a processing circuit coupled to the wireless communication circuit, the processing circuit configured to:
receive a peer-to-peer link request for time division duplex (TDD) communications from an originator wireless device, wherein the originating wireless device includes a first diversity receiver and a second diversity receiver, wherein the first diversity receiver is configurable to receive first signals using a first frequency of a downlink frequency band of a frequency division duplex (FDD) network and wherein the second diversity receiver is configurable to receive second signals using the first frequency when the second diversity receiver is in a first mode and using a second frequency of an uplink frequency band of the FDD network when the second diversity receiver is in a second mode;
generate a list of available and reachable wireless devices in proximity to the originator wireless device;
send the list to the originator wireless device, receive from the originator wireless device a selection of an indicated device from the list as a target wireless device;
allocate a channel for a peer-to-peer link between the originator wireless device and the target wireless device, wherein the second diversity receiver is configured to receive second signals using a frequency that corresponds to the channel;
receive a deallocation message associated with the peer-to-peer link, wherein the deallocation message is received from the originator wireless device or the target wireless device; and
store one or more time indicators associated with an allocation of the peer-to-peer link, associated with a deallocation of the peer-to-peer link, or a combination thereof.

52. The device of claim 51, wherein the processing circuit is further configured to:
notify the target wireless device of the peer-to-peer link request by the originator wireless device;
determine whether the target wireless device accepts the peer-to-peer link with the originator wireless device; and
notify the originator wireless device that the target wireless device has accepted the peer-to-peer link, wherein the deallocation message indicates that the peer-to-peer channel is to be deallocated.

53. A system comprising:
an originator wireless device;
a target wireless device;
and a wireless network manager device, wherein the wireless network manager device comprises:
a wireless communication circuit configured to communicate with the originator wireless device and target wireless device, establishing a peer-to-peer communication between the originator wireless device and the target wireless device; and
a processing circuit coupled to the wireless communication circuit, the processing circuit configured to:
receive a peer-to-peer link request for time division duplex (TDD) communications from an originator wireless device, wherein the peer-to-peer link request requests the wireless network manager to allocate a channel for a peer-to-peer link, and wherein the channel corresponds to an uplink channel of an uplink frequency band of a frequency division duplex (FDD) network;
allocate the channel for the peer-to-peer link between the originator wireless device and the target wireless device;
send a first message to target wireless device to invite the target wireless device to form the peer- to-peer link, via the channel, with the originator wireless device;
send a second message to the originator wireless device indicating the channel for the peer-to-peer link is allocated;
receive a deallocation message associated with the peer-to-peer link, wherein the deallocation message is received from the originator wireless device or the target wireless device; and
store one or more time indicators associated with an allocation of the peer- to-peer link, associated with a deallocation of the peer-to-peer link, or a combination thereof,
wherein the originating wireless device includes a first diversity receiver and a second diversity receiver, wherein the first diversity receiver is configurable to receive first signals using a first frequency of a downlink frequency band of a frequency division duplex (FDD) network and wherein the second diversity receiver is configurable to receive second signals using the first frequency when the second diversity receiver is in a first mode and using a second frequency of an uplink frequency band of the FDD network when the second diversity receiver is in a second mode.

54. The system of claim 53, wherein the processing circuit is further configured to allocate the channel for a second peer-to-peer link between another originator wireless device and another target wireless device, and wherein the channel is allocated for the second peer-to-peer link after the channel is allocated for the peer-to-peer link between the originator wireless device and the target wireless device and before the channel is deallocated for the peer-to-peer link between the originator wireless device and the target wireless device.

55. The system of claim 53, wherein the originator wireless device:
comprises a first processor coupled to the first wireless transceiver, the first processor configured to:
send to the wireless network manager device an indication of the target wireless device;

receive the second message;
configure the second diversity receiver to receive the second signals using the channel based on the second message; and
transfer data directly to the target wireless device via the channel of the peer-to-peer link.

56. The system of claim 55, wherein the target wireless device comprises:
a second wireless transceiver including a third diversity receiver and a fourth diversity receiver, wherein the third diversity receiver is configurable to receive third signals using a third frequency of the downlink frequency band of the FDD network, and wherein the fourth diversity receiver is configurable to receive fourth signals using either the third frequency or a fourth frequency of the uplink frequency band; and
a second processor coupled to the second wireless transceiver, the second processor configured to:
receive the first message;
configure the fourth diversity receiver to receive the fourth signals using the channel based on the first message; and
receive the data from the originator wireless device via the channel of the peer-to-peer link.

* * * * *